(12) United States Patent
Harlow

(10) Patent No.: US 9,067,659 B2
(45) Date of Patent: Jun. 30, 2015

(54) ACTUATION SYSTEMS PRINCIPALLY FOR INFLATABLE EMERGENCY EQUIPMENT

(71) Applicant: AIR CRUISERS COMPANY, Wall Township, NJ (US)

(72) Inventor: Andrew Mahlon Harlow, Brick, NJ (US)

(73) Assignee: Air Cruisers Company, Wall Township, NJ (US)

(*) Notice: Subject to any disclaimer, the term of this patent is extended or adjusted under 35 U.S.C. 154(b) by 229 days.

(21) Appl. No.: 13/721,622

(22) Filed: Dec. 20, 2012

(65) Prior Publication Data

US 2014/0174539 A1 Jun. 26, 2014

(51) Int. Cl.
| | | |
|---|---|---|
| *F16K 15/20* | (2006.01) | |
| *B60C 29/00* | (2006.01) | |
| *B63C 9/18* | (2006.01) | |
| *B63C 7/10* | (2006.01) | |
| *B64D 25/18* | (2006.01) | |
| *B64D 25/14* | (2006.01) | |
| *B63C 9/00* | (2006.01) | |

(52) U.S. Cl.
CPC ... *B63C 9/24* (2013.01); *B63C 9/18* (2013.01); *B63C 7/10* (2013.01); *B64D 25/18* (2013.01); *B63C 2009/007* (2013.01); *B64D 25/14* (2013.01)

(58) Field of Classification Search
CPC ........... F16K 31/465; B63C 9/24; B63C 9/18; B63C 7/20; B63C 2009/007
USPC ....... 137/223; 251/294; 441/93–94; 244/100 A; 222/5; 74/89.2, 89.22; 254/392, 402, 403, 411, 413
See application file for complete search history.

(56) References Cited

U.S. PATENT DOCUMENTS

| | | | | |
|---|---|---|---|---|
| 2,859,629 | A | * 11/1958 | Parker et al. | .................. 74/89.22 |
| 3,630,413 | A | * 12/1971 | Beckes et al. | ...................... 222/5 |
| 4,260,075 | A | * 4/1981 | Mackal | ............................... 222/5 |
| 7,644,739 | B1 | 1/2010 | Vezzosi et al. | |
| 8,079,547 | B2 | 12/2011 | Rivault et al. | |
| 2014/0014318 | A1* | 1/2014 | Mail | ............................ 166/77.4 |

* cited by examiner

*Primary Examiner* — John K Fristoe, Jr.
*Assistant Examiner* — Kelsey Rohman
(74) *Attorney, Agent, or Firm* — Kilpatrick Townsend & Stockton LLP; Dean W. Russell

(57) ABSTRACT

Actuations systems in which pulley systems may be used as redundant (back-up) mechanisms are described. The systems provide mechanical advantage, especially useful when manual input is required to deploy a back-up mechanism. A pulley may be integrated into a clevis, a cable routed about the pulley, and one end of the cable made stationary, causing the pulley to counterbalance approximately twice the input force provided.

5 Claims, 4 Drawing Sheets

ACTUATION SYSTEMS PRINCIPALLY FOR INFLATABLE EMERGENCY EQUIPMENT

FIELD OF THE INVENTION

This invention relates to actuation systems and more particularly, but not necessarily exclusively, to manual, redundant (back-up) actuators of inflatable, buoyant emergency equipment such as life rafts, flotation devices, or evacuation slides.

BACKGROUND OF THE INVENTION

U.S. Pat. No. 8,079,547 to Rivault, et al., describes exemplary flotation systems especially useful for helicopters and other vessels. The flotation systems may include both floats and life rafts if desired. A single actuator may cause inflation of both a float and a raft; alternatively, separate activators may be employed. Noted as well in the Rivault patent is that "automatic or manual activators could be used for redundancy or back-up purposes." See Rivault, col. 2, ll. 18-19.

Commonly-owned U.S. Pat. No. 7,644,739 to Vezzosi, et al., discloses examples of actuators for inflatable structures. One type of existing main actuation system identified in the Vezzosi patent includes a container of pressurized gas and "a cable and pulley system routed through [an] aircraft." See Vezzosi, col. 1, l. 30. According to the Vezzosi patent, "[w]hen a pull handle or similar device associated with the system is activated," a valve opens and "the pressurized gas is discharged from the container and into the life raft causing its rapid inflation." See id. at ll. 31-35. No discussion of using a pulley system to obtain mechanical advantage is included, however. Nevertheless, the contents of the Rivault and Vezzosi patents are incorporated herein in their entireties by this reference.

SUMMARY OF THE INVENTION

Undeveloped to date are any actuation systems in which a pulley system is used as a redundant or back-up mechanism for a main pneumatic actuator such as a piston. Presently, any manual back-up for a failed main actuator typically is attached directly to an output load, such as a clevis, which in turn is connected to a source of inflation gas. This sort of direct attachment requires maximum input force to be used, as no mechanical advantage is available. By contrast, utilizing the back-up pulley system of the present invention gains mechanical advantage, thus reducing the input force necessarily provided manually.

In at least one embodiment of the invention, a (preferably low-friction) pulley is integrated into the clevis. A cable may be attached or otherwise fixed at a first end portion to a stationary anchor point and at a second end portion to an input source. In between the two end portions, the cable may be routed around the pulley and, beneficially, along a guide surface that itself preferably is either a low-friction surface or a secondary pulley.

As the input source applies tension to the cable, the first end portion remains stationary at the anchor point. Consequently, the pulley must counterbalance twice the input load because the cable is tensioned on segments on either side of the pulley. The counterbalancing force is transmitted through the pulley to the clevis and thence to the output load in communication with the clevis. Preferably the output load will be a valve or other device associated with a source of inflation gas, although the output load is not limited to such devices. Also preferably, positioning of the anchor point and guide surface are such that the segments of the cable on either side of the pulley remain parallel (or substantially so) through much (or all) of the piston stroke.

It thus is an optional, non-exclusive object of the present invention to provide redundant (back-up) mechanisms for actuators.

It is another optional, non-exclusive object of the present invention to provide back-up mechanisms employing one or more pulleys.

It is also an optional, non-exclusive object of the present invention to provide manually-operated back-up mechanisms in which mechanical advantage is gained.

It is a further optional, non-exclusive object of the present invention to provide back-up mechanisms in which an object may be inflated when the mechanism is utilized.

It is an additional optional, non-exclusive object of the present invention to provide back-up mechanisms in which a cable may be routed around a pulley, with one end portion of the cable fixed in position and the other end portion directly or indirectly connected to an input source.

It is, moreover, an optional, non-exclusive object of the present invention to provide back-up mechanisms in which portions of the cable on opposite sides of the pulley remain generally parallel as an output load moves.

Other objects, features, and advantages of the present invention will be apparent to those skilled in the relevant art with reference to the remaining text and the drawings of this application.

DETAILED DESCRIPTION

Figure 1:
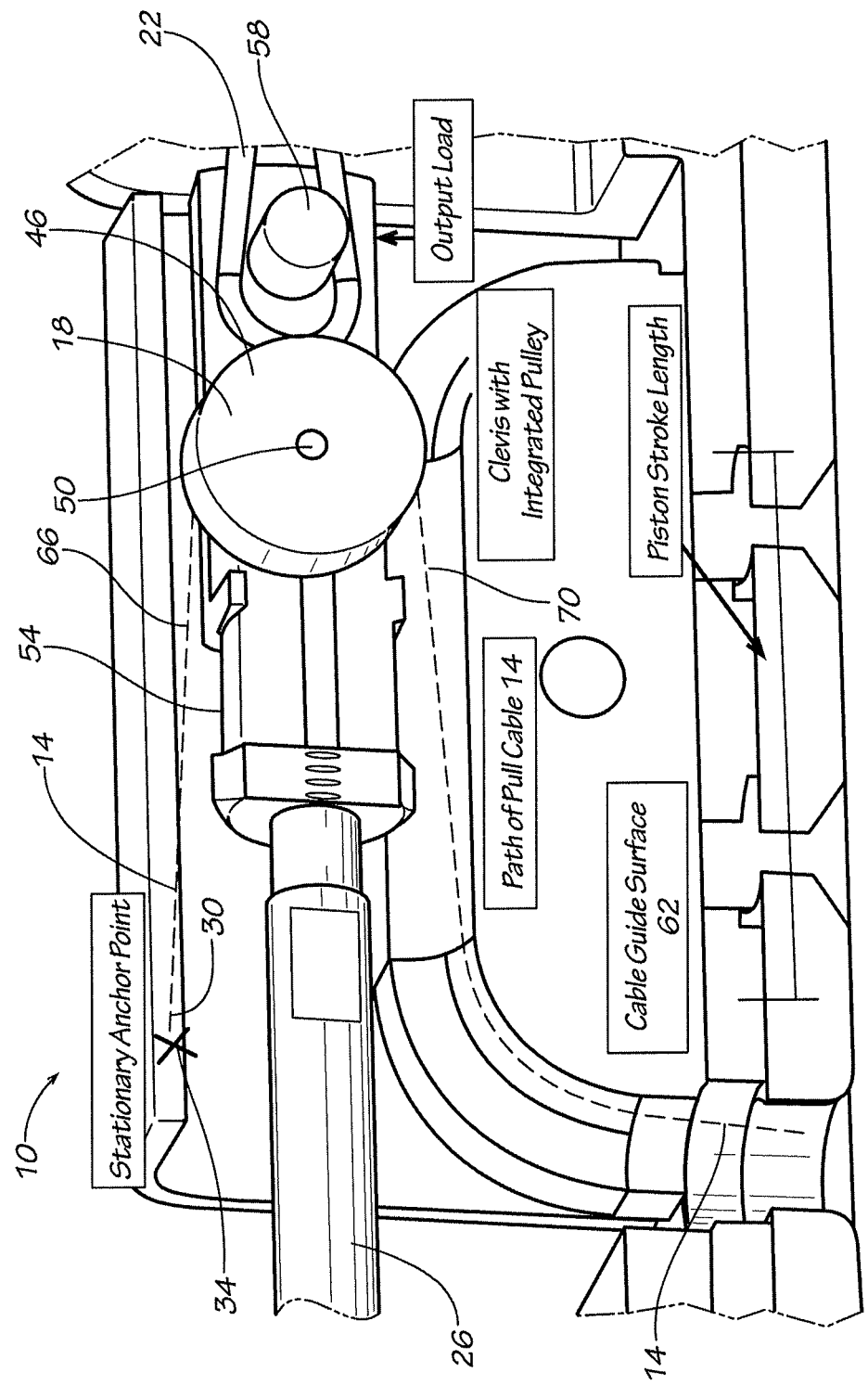
FIG. 1 is a schematic, partially cut-away representation of portions of a redundant or back-up mechanism of the present invention.
Figure 4:
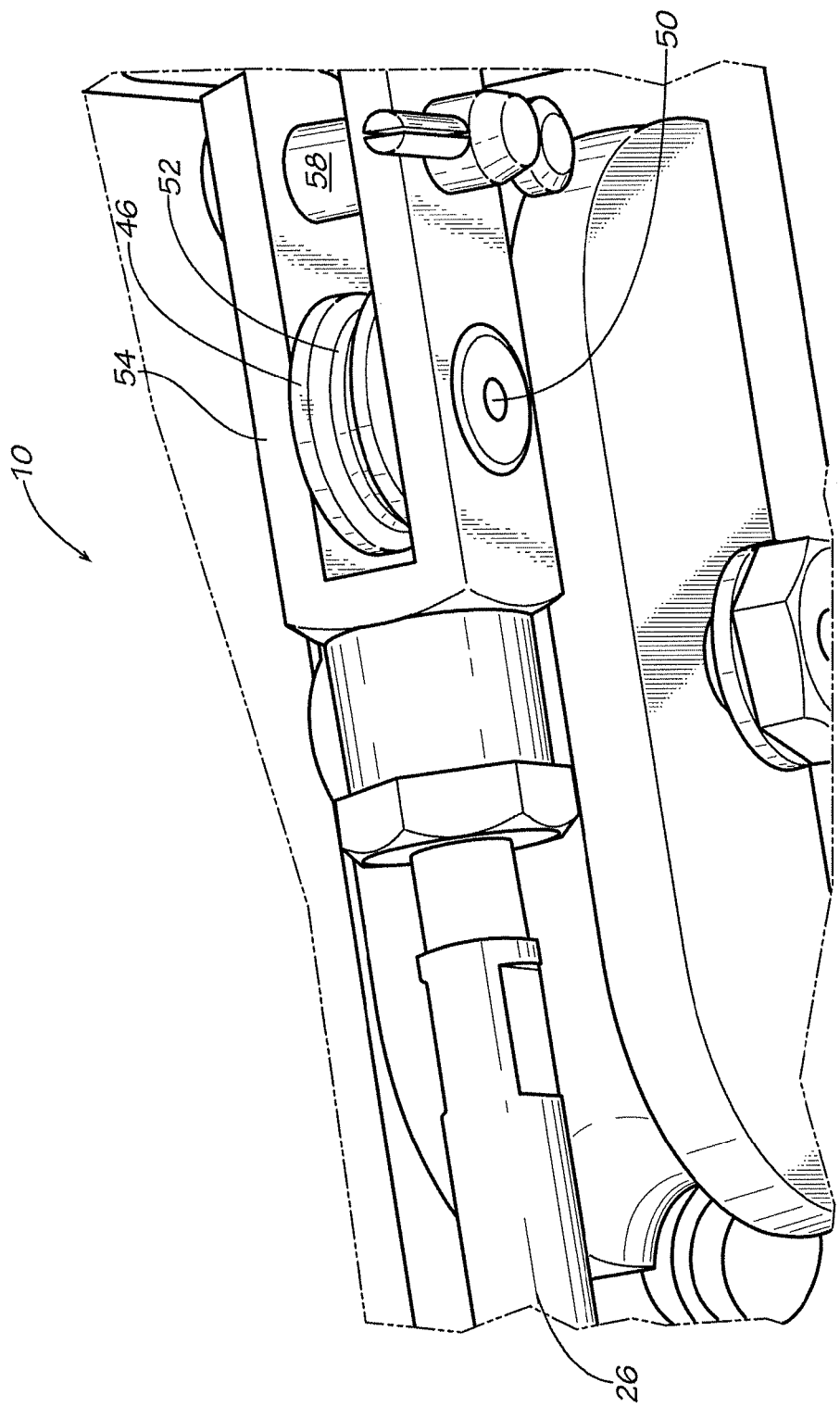
FIG. 4 is a schematic, non-cutaway version of the portions of the mechanism of FIG. 1.

Illustrated in FIGS. 1 and 4 are portions of back-up mechanism 10 of the present invention. Mechanism 10 may include cable 14 (shown in dotted lines in FIG. 1) and pulley system 18. Although clevis 54 is a preferred connection for use with mechanism 10, other means of connecting to an outlet load may be employed instead. Also shown in FIGS. 1 and 4 is piston 26. In general, tensioning of cable 14 causes compression of piston 26 so as to displace clevis 54. In turn, displacement of clevis 54 causes change in an output load. One preferred output load is an output cable 22 connected to a valve or other means for allowing gas to communicate with an inflatable object such as, but not limited to, a life raft or other flotation device.

Figure 2:
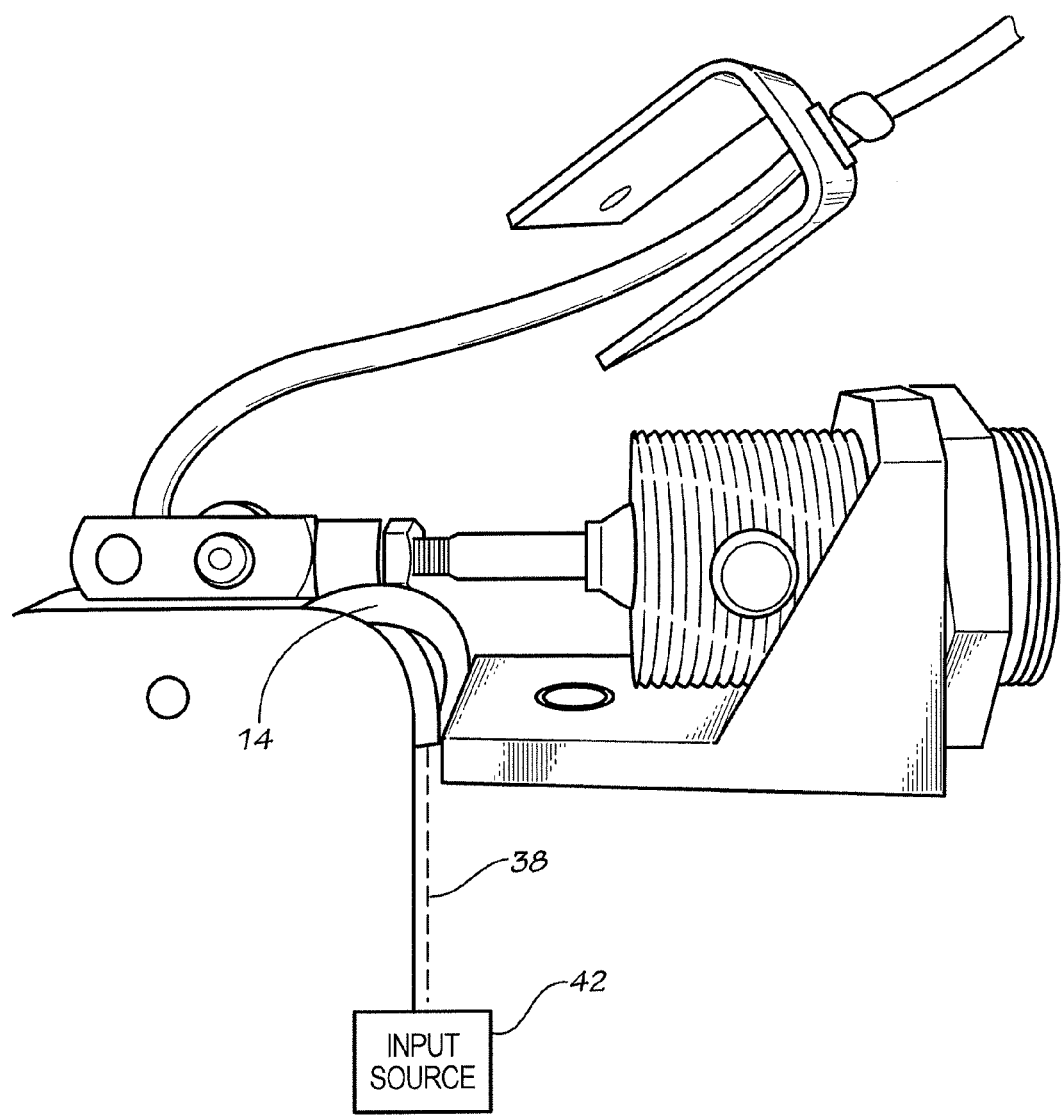
FIG. 2 is a pictorial, partially-schematicized representation of portions of a mechanism generally consistent with FIG. 1.

As depicted in FIG. 1, first end portion 30 of cable 14 may be attached or otherwise connected to an anchor at a location such as anchor point 34. The anchor may be any object, device, structure, etc., adequate to fix the position of first end portion 30 notwithstanding movement of second end portion 38 of cable 14 (see FIG. 2). By contrast, second end portion 38 is directly or indirectly connected to input source 42. In practice, input source 42 may be a handle configured to be grasped by a human hand, although other equipment may comprise input source 42 additionally or instead.

Pulley system 18 may include at least wheel 46 and pin 50. Wheel 46 is configured with groove 52 or otherwise so as to receive cable 14 along a portion of its circumference. Alternatively, if wheel 46 is not circular, it may receive cable 14 along a portion of its periphery. Wheel 46 further may be configured to rotate about pin 50, although such rotation is not necessary for successful operation of embodiments of mechanism 10 consistent with FIGS. 1-3. Although a non-rotatable wheel 46 arguably would not then be part of a "pulley system" in common parlance, it remains within the definition of pulley system as used herein.

At least portions of mechanism 10 advantageously may be integrated with piston 26. As illustrated in FIG. 1, for example, clevis 54 may be integral with piston 26 as part of a main actuation system. Clevis 54 may extend piston 26 and include an internal post 58 about which output cable 22 is fitted. If piston 26 is compressed automatically, it will cause clevis 54 (and post 58) to move in turn. Movement of post 58 will cause output cable 22 to displace linearly and thereby act upon the output load. By adding an integrated pulley system 18, manual back-up may be provided integrally to compress piston 26 should the automatic main actuator fail to do so.

Also illustrated in FIG. 1 is guide surface 62 for cable 14. Guide surface 62 is optional; if present, it preferably is a low-friction surface or a secondary pulley. Likewise if present, guide surface 62, as well as anchor point 34, preferably are offset from clevis 54 sufficiently to allow segments 66 and 70 of cable 14 adjacent pulley system 18 to remain parallel (or substantially so) throughout the stroke of piston 26.

Figure 3:
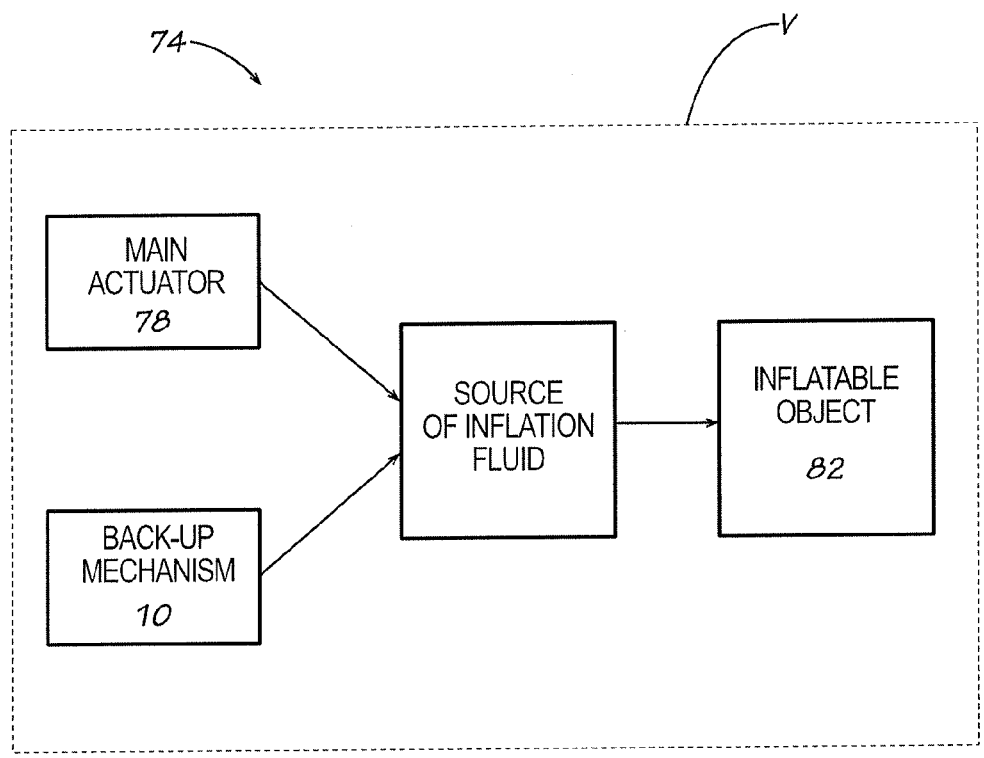
FIG. 3 is a simplified block diagram of main and back-up actuator mechanisms for an inflatable object.

FIG. 3, finally, schematically represents a highly-simplified arrangement 74 including back-up mechanism 10. As noted earlier, mechanism 10 may be deployed together with main actuator 78 and inflatable object 82, which may be connected to or otherwise associated with vessel V such as (but not limited to) a fixed- or rotary-wing aircraft. Main actuator 78 is configured to communicate with inflatable object 82 so as to provide inflation fluid thereto. Back-up mechanism 10 also is configured in this manner and may be used to inflate object 82 should main actuator 78 fail to do so.

When input source 42 is active (as when someone pulls on second end portion 38), cable 14 tenses. Segments 66 and 70 become taut, after which they apply force to wheel 46. Wheel 46 thus must counterbalance twice the input loading, providing a mechanical advantage of up to one hundred percent as compared to a direct attachment of cable 14 to clevis 54.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A method of manually inflating an inflatable object, comprising:
    a. accessing an actuator of the inflatable object, the actuator comprising a cable (i) having an anchored first end portion and (ii) being received by a pulley system; and
    b. tensioning a second end portion of the cable so as to displace the pulley system linearly and thereby displace a piston and cause inflation of the inflatable object.

2. An actuation system for inflating an inflatable object, comprising:
    a. a cable having (i) an anchored first end portion and (ii) a second end portion configured to be grasped manually and moved linearly;
    b. a pulley system comprising (i) a wheel having a periphery configured to receive a portion of the cable and (ii) configured to be moved linearly when the second end portion is moved linearly;
    c. a connector (i) configured to be moved linearly when the pulley system moves linearly and (ii) connected directly or indirectly to a source of inflation fluid; and
    d. a piston (i) connected to the pulley system and (ii) configured to be displaced when the pulley system moves linearly.

3. An actuation system according to claim 2 in which the connector comprises a clevis integral with the pulley system.

4. An actuation system according to claim 3 in which the clevis includes a post.

5. An actuation system according to claim 4 further comprising an output cable secured about the post so as to connect the connector directly or indirectly to the source of inflation fluid.

* * * * *